Patented June 3, 1952

2,599,091

UNITED STATES PATENT OFFICE 2,599,091

FORMING PIGMENT IN CELLULOSE FIBER AND PAPER CONTAINING THE PIGMENTED FIBER

William Lutton Craig, Westport, Conn., assignor to R. T. Vanderbilt Company, Inc., New York, N. Y., a corporation of New York No Drawing. Application April 23, 1946, Serial No. 664,425

15 Claims. (Cl. 92—3)

This invention relates to improvements in paper manufacture and includes a new composite pigmented sheet of paper and an improved method for its production.

The new paper of the present invention is a pigmented paper made up largely of untreated stock combined with a regulated amount of heavily pigmented modified stock containing the pigment within as well as on and around the fibers of the modified stock.

The present invention is based upon the discovery that a portion of the cellulosic fiber stock (chemical, semi-chemical, or mechanical pulp) used in making paper, including cellulose fibers (chemical pulp) such as kraft, sulfite, soda pulp etc., and particularly groundwood (lignocellulose) fibers (mechanical pulp), can be treated in the form of a suspension in water or pulp with calcium chloride in the form of a strong solution to modify the cellulose or the ligno-cellulose, and that the so modified cellulosic fibers can then be treated with a solution of a soluble salt such as sodium carbonate to precipitate an insoluble pigment such as calcium carbonate within the modified fibers as well as on and around the modified fibers; and that the resulting modified and pigmented stock can advantageously be blended with or admixed with untreated stock to produce an improved composite pigmented paper.

In general only a relatively small proportion of the total amount of pulp or stock used in making the paper is subjected to the treatment with calcium chloride to modify the fibers and with sodium carbonate to precipitate calcium carbonate within the modified fibers; and the relatively small amount of pulp so treated and modified and pigmented is then admixed with the main portion of the stock from which the paper is to be made to give a composite stock made up of untreated fibers and modified pigmented fibers for use on the paper machine in making the new sheet of paper.

The present invention is more or less generally applicable to the production of papers of different kinds, including those made mainly or entirely of cellulose fibers; as well as composite papers from mixtures of cellulose fibers and groundwood in varying proportions, including newsprint, which is largely groundwood with a relatively small amount of admixed, long fiber cellulose stock.

The cellulose fibers used in making the new paper and which are subjected to the treatment to modify and pigment the fibers include long fiber stocks such as sulfite pulp, sulfate pulp, soda pulp, etc. The groundwood fibers which may be treated to modify and pigment the fibers are the mechanical pulps commonly made by grinding and commonly used in making, e. g., newsprint. The fibers are advantageously treated in the form of a relatively concentrated pulp or stock. Thus stocks containing up to 4 or 5% or more of fibers (dry basis) are advantageously treated and the treatment is also applicable to much more concentrated stocks at a stock consistency as high as 13% or higher, where higher concentrations are available.

The stock treated may be bleached or unbleached stock, and may be stock which has been beaten in the beater, particularly in the case of long fiber chemical pulp, or unbeaten disintegrated stock.

The treatment of the fibers in suspension in water is carried out with the addition of calcium chloride in sufficient amount to give a relatively strong calcium chloride solution of sufficient strength to modify the cellulose or ligno-cellulose of the fibers. Solutions up to saturated solutions of calcium chloride can be used, e. g., solutions of around 15% to 20%, more or less of calcium chloride.

When solid calcium chloride is added to stock containing e. g., up to 4 or 5% of chemical pulp it brings about a profound modification of the cellulose fibers after a few minutes, e. g., 5 to 10 minutes, with proper agitation. The fibers become more or less gelatinous and transparent in appearance. It may be the calcium chloride combines with the cellulose to form complex products, or it may be the calcium chloride exerts a modifying or hydrating effect upon the cellulose molecules. Whatever the theoretical explanation of the action of the calcium chloride on the cellulose may be, it brings about a profound change in the nature and appearance of the cellulose fibers. Similarly, when groundwood fibers are similarly treated with calcium chloride the action is to bring about a profound change in the nature and appearance of the cellulose fibers.

After this treatment with calcium chloride the stock is treated with a solution of a soluble salt such as sodium carbonate (soda ash) or sodium borate, e. g., in the form of a 10% solution in sufficient amount to react with the calcium chloride and precipitate an insoluble pigment, e. g., calcium carbonate or calcium borate in and on the modified fibers. The amount of added soluble salt is equal to or somewhat more or less than the amount which is sufficient to react with all of the calcium chloride used. With cellulose fibers the amount of soluble salt is advantageously slightly in excess of that required to react with all of the calcium chloride; but with groundwood fibers care should in general be taken to avoid any excess of the alkali salt which would darken or otherwise affect the stock; and with such stock the calcium chloride and sodium carbonate are used in exact reacting proportions or with a slight excess of calcium chloride to avoid any excess of sodium carbonate.

The resulting treated and pigmented stock is highly hydrated and has little strength, or relatively much less strength than the untreated stock, but it carries the precipitated pigment distributed throughout the hydrated stock while pigment is also precipitated on the hydrated stock and in the water in which the stock is suspended.

The specially treated and modified and pigmented stock is highly pigmented. An amount of pigment can be combined with the stock which is considerably in excess of the weight of the stock treated (dry basis). Thus cellulose fibers can be modified and pigmented to give a proportion of pigment to stock (dry basis) of up to around two to one or more. Groundwood stock can be pigmented to a much greater extent, up to around 4 parts of pigment to 1 of fiber (dry basis) or even higher.

According to the present invention the highly pigmented and hydrated modified stock is admixed with untreated stock and the resulting composite or admixed stocks are used in the paper machine for making the new sheet of paper.

The proportions of pigmented modified stock and of untreated stock which are admixed to form the new sheet of paper can be somewhat varied. In general, it is advantageous to subject only a relatively small proportion or percentage of the total stock used to the modifying and pigmenting treatment and to admix it with a large proportion of untreated stock. In this way the final sheet of paper will have a desirable strength, due to the large proportion of unmodified fibers used, but the entire sheet will be pigmented by the admixed small amount of heavily pigmented modified stock.

The stock after treatment with the calcium chloride and with the soluble sodium salt will contain sodium chloride in solution. In general, this is undesirable and is removed by washing the treated stock to remove the sodium chloride or the greater portion of it before the modified pigmented stock is admixed with the untreated stock and fed to the paper machine. The washing of the treated stock can be carried out by decantation or by washing in pulp washers with replacement of the sodium chloride solution with fresh water, care being taken that the water drawn off is clear or relatively clear water to avoid or minimize loss of finely suspended pigment during the washing operation.

The main portion of the stock with which the modified pigmented stock is admixed may be stock which is prepared, e. g., in the beater in the ordinary way and which may be sized and prepared for paper making before the treated stock is added. The stocks are thoroughly admixed together before the composite stock goes to the paper machine; and, in making a sized sheet, or when using mechanical stock, the admixing is advantageously carried out at a point close to the paper machine such as the machine chest or later with sufficient mixing to insure uniformity of the stock fed to the machine.

Rosin soap and alum are commonly added to the untreated stock for sizing. If the stocks after admixture are not sufficiently acid a further amount of alum is advantageously added at the time of mixing or before the admixed stocks go on the paper machine. The main portion of the stock may thus be ordinary stock prepared in the beater and which may be sized and prepared for paper making before the specially treated and pigmented stock is admixed therewith to form the composite pigmented stock for the paper machine.

Where the paper is to be made from admixed groundwood and chemically cooked cellulose pulp, either a portion of the cellulose stock or of the groundwood stock may be specially treated to modify and pigment it before admixing with the remainder of the stock. In many cases it is more advantageous to treat a portion of the groundwood stock because of the increased amount of pigment which can be incorporated in it and retained by it, care being taken, as above explained, to avoid excess of alkali in the treatment which would tend to darken or otherwise affect the groundwood stock treated.

The paper can be made from the admixed stocks on Fourdrinier or cylinder machines and various kinds of paper can be made including book paper, magazine paper, newsprint, and other printing papers which are directly prepared as pigmented papers. The present invention enables a sheet of paper to be produced approaching a precoated sheet on a paper machine. Paper can thus be made with up to 40% carbonate pigment included in the composite furnish to give a precoated sheet, and only a small proportion of the stock, e. g., 10% of groundwood stock, need be treated to give a highly pigmented composite sheet.

Newsprint is commonly made from groundwood pulp with around, e. g., 8 to 12% of long fiber sulfite pulp. In general, only a small percentage of the total stock will be treated to modify it and pigment it so that most of the stock will be untreated stock which retains its full strength. The treatment of a small portion of the stock tends to gelatinize the fiber and cause loss of strength of the fibers treated, but by heavily treating a small amount of the fiber and mixing it with a large amount of untreated fiber there is obtained a strong sheet which is pigmented by the gelatinizing and pigmenting treatment of the small portion of pulp.

The percentage of the total stock to be treated in making a sheet of paper can be somewhat varied. For various grades of paper an amount of around 10% of the stock can advantageously be treated. The small proportion of the stock treated can be heavily pigmented so that it will contain, e. g., in the case of chemical cellulose pulp up to around twice as much pigment as fibers (dry basis) or more, and in the case of groundwood pulp up to around four times as much pigment as fiber (dry basis) or more. By admixing, e. g., 10% of treated stock heavily pigmented with an amount of pigment considerably in excess of the weight of the stock treated and admixing the treated stock with the remaining 90% of untreated stock and using the resulting mixed stock in making paper, a pigmented stock of good strength can be directly produced in the paper machine.

The proportion of stock to be treated before admixture with the untreated stock can be varied. Thus, the percentage of stock treated may vary between 5 and 25%, more or less. In general, it is advantageous to treat a much smaller proportion of the total stock than the proportion of untreated stock with which it is admixed in making the new sheet of paper.

In making newsprint, where only around 5% or 10%, or even up to 15% or 20%, or more of carbonate filler is desired in the resulting paper, a small percentage, for example, around 5% more or less of the groundwood stock can be treated to incorporate an amount of pigment equal to or considerably in excess of the weight of the stock treated and this can then be admixed with the remainder of the stock for making the newsprint, thus giving directly a pigmented newsprint with, e. g., 5% or 10% or 15% or 20% of carbonate filler.

In making groundwood printing paper from a furnish containing large proportions of both groundwood and chemical pulp a small proportion, e. g., 10% of groundwood pulp may be treated to modify and pigment it to incorporate, e. g., up to 4 pounds or more of carbonate filler to 1 pound of fiber (dry basis) and this 10% of treated groundwood pulp can then be admixed with the 90% of untreated stock (groundwood and chemical) to make groundwood printing paper. Thus, for example, in a furnish made up of about 70% long fiber chemical pulp and 30% of groundwood, about one-third of the groundwood or 10% of the total pulp can be advantageously treated to incorporate the carbonate filler and this treated groundwood stock then admixed with the untreated stock to form a composite furnish which is supplied to the paper machine for making groundwood printing paper.

The treatment of only a small portion of the stock to modify and pigment it makes it possible to use the greater portion of the stock in an untreated state and prepared in the usual manner. While the small proportion of stock which is treated and gelatinized and pigmented has less strength than the untreated stock, it nevertheless blends with the untreated stock to pigment the entire stock in a particularly advantageous way, while the greater portion of the stock is untreated and retains the full strength of the untreated fibers. The treatment of only a small portion of the stock also makes it possible to use much smaller treating equipment than would be required for treating all of the stock or a large proportion of the stock.

The treatment of the stock with the calcium chloride to bring about the modifying and gelatinizing action and the subsequent treatment with, e. g., sodium carbonate solution to precipitate the calcium carbonate in and on and around the modified stock can be carried out in existing equipment or in simple apparatus provided with means for agitating the stock and the subsequent washing to remove the sodium chloride from the treated and pigmented stock and to replace it with fresh water can also be carried out in existing equipment. The handling of the untreated portion of the stock can be carried out in existing equipment and in accordance with regular procedure up to the time of the admixture of the modified and pigmented stock therewith, which, in the case of low-pH stock, is advantageously close to the paper machine, e. g., at the machine chest or in the headbox, as previously indicated. The stocks before being supplied to the Fourdrinier or other paper machine will be diluted to proper consistency, e. g., around 1% of cellulose (dry basis) more or less.

The invention will be further illustrated by the following specific examples but it will be understood that the invention is not limited thereto. The parts are by weight.

Example I.—50 parts of groundwood pulp containing 3.5% of fibers (dry basis) are treated by the addition thereto of 22 parts of anhydrous calcium chloride which is added in a solid state and dissolved in the water of the pulp and allowed to act thereon, e. g., about 10 minutes, with resulting modification of the pulp, the stock being stirred to insure thorough distribution of the calcium chloride and its action on the fibers. After the calcium chloride treatment there is added 20 parts of sodium carbonate (soda ash) dissolved in water to form a 10% solution and this solution is thoroughly admixed with the treated stock to bring about reaction between the sodium carbonate and the calcium chloride to precipitate calcium carbonate within the fibers of the treated stock as well as on and around the fibers of the stock. This reaction takes place in the period of about 5 to 10 minutes with continued agitation but the action can be permitted to take place for a longer time. The sodium chloride solution is then removed from the stock.

The modified and pigmented stock is then admixed with 440 parts of groundwood pulp of 3.5% fibers (dry basis) and 325 parts of unbleached sulfite pulp of similar fiber content and the resulting stock is then diluted and formed into a sheet of paper. A sheet of paper so produced has a filler content of about 21.5% as computed from the ash and a Mullen test of 12.75, while a similar sheet made of the same pulp untreated and with 20.2% clay filler had a Mullen strength of 11.75.

Example II.—The procedure followed is the same as that of Example I except that 50 parts of unbleached sulfite pulp of 3.5% fiber content (dry basis) is treated with calcium chloride and subsequently with sodium carbonate to modify and pigment the pulp and the treated pulp is then admixed with 490 parts of groundwood stock and 275 parts of unbleached sulfite stock, each of 3.5% fiber content (dry basis).

A sheet of paper so produced has a calcium carbonate filler content of about 17.6 as computed from the ash and a Mullen test of 12.25.

In the above examples relatively large proportions of both groundwood and unbleached sulfite stock are used, with treatment of only a relatively small part of the stock and admixture of the treated stock with the main portion of untreated stock.

In a similar manner newsprint stock made up mainly of groundwood and a small amount of long fiber chemical pulp, such as sulfite or sulfate pulp, e. g., around 8 to 12%, can be similarly treated, e. g., by treating up to 5% or 10% or more of the groundwood stock to modify and pigment it and by then admixing the treated and pigmented and washed stock with the main portion of the stock (untreated) for making a sheet of newsprint paper which will be directly produced as a pigmented newsprint stock.

Example III.—A portion of the groundwood used in making groundwood printing paper is specially treated to pigment it, this treatment being carried out as follows:

2400 parts of groundwood pulp of 2.5% fiber content equivalent to 60 parts of dry fibers are pumped to a treating tank and 440 parts of calcium chloride (74% CaCl₂) are added and mixed thoroughly and dissolved and the agitation is continued for about 10 minutes to effect thorough treatment and gelling of the stock by the action of calcium chloride. A sodium carbonate solution is made by dissolving 300 pounds of soda ash in water to form a solution of about 10%. This solution is pumped into the calcium chloride treated stock and allowed to mix therewith, with continued agitation, until complete precipitation has occurred. The resulting treated stock in the form of a fibrous precipitate is pumped to storage tanks and allowed to settle without agitation. After settling, the top liquor (sodium chloride solution) is drawn off and replaced with fresh water to give a treated stock ready for blending with the untreated stock.

The untreated stock is prepared as a regular beater furnish from 9600 parts of groundwood of 2.5 consistency (240 parts dry basis), 9600 parts of unbleached sulfite of 2.5% consistency (240 parts dry basis), 9 parts of titanium dioxide and 9 parts of alum. This furnish prepared in a beater is passed through a Jordan and the specially treated stock is then admixed therewith in the paper making machine at the mixing box, with thorough intermixture. Alum is added to the mixing box to keep the stock acid.

This stock is then passed to the Fourdrinier machine and formed into a sheet of paper which can be calendered or super-calendered. Sheets of paper so produced contained around 26% of calcium carbonate filler as computed from ash. A sheet of paper so produced showed a Mullen test of 14.6, a tensile of 6.4–3.6, and a tear of 25–32.

In such a composite sheet of paper the specially treated and gelatinized and pigmented stock forms a valuable pigmenting filler stock for admixing with the regular beater furnish. While the treated stock if used by itself to make a sheet of paper would give a paper of little strength, yet when used as a pigmenting filler for admixture with a large proportion of untreated stock the resulting sheet of paper has good tensile strength and the treated stock apparently blends with the untreated stock to give not only a pigmented paper but an improved sheet of paper which can be directly produced as a pigmented paper in the paper machine.

Varying proportions of newsprint and chemical cellulose pulp can be used in making papers of different kinds and in some cases the paper may be made entirely of cellulose pulp or mixtures of cellulose pulps with little or no admixed groundwood. Similarly paper such as newsprint can be made mainly of groundwood with only small amounts of admixed long fiber chemical stock. It is thus possible to produce a wide range of pigmented papers including book paper, magazine paper, newsprint, and other types of paper which are pigmented in a particularly advantageous manner.

The special treatment of a portion of the pulp to be pigmented results in the precipitation of the pigment within the fibers of the stock as well as on and around the fibers and enables a much larger weight of pigment to be incorporated in the pulp so treated than the weight (dry basis) of the fibers treated. The modified and pigmented pulp may thus be considered in the nature of a fibrous pigment with the pigment intimately combined with a lesser weight of the modified and gelatinized stock. The admixture of this modified and pigmented stock with the untreated stock results in distribution of the pigment or fibrous pigment or pigmented fibers through the composite pulp so that a pigmented sheet of paper can be directly produced with the pigment contained within as well as on and around the fibers. Although the pigmented portion of the stock is only a relatively small portion of the total stock from which the paper is made, yet by heavily pigmenting the treated portion a sheet of paper can be produced with a high pigment content and with other desirable properties.

It will thus be seen that the present invention provides a new sheet of paper made up largely or mainly of untreated fibers admixed with a relatively small proportion of highly pigmented fibers pigmented by a process in which the carbonate is precipitated both in and on and around the fibers and with the fibers of the treated portion of the stock themselves highly hydrated or gelatinized by the treatment.

It will further be seen that the improved process of the present invention involves treating only a part of the stock to modify it and pigment it followed by admixing of this pigmented and modified stock with a large proportion of untreated stock.

It will further be seen that the treatment of a portion of the stock with strong calcium chloride solution brings about a modification and gelatinizing or hydration of the stock so treated and that the precipitation of the calcium chloride with, e. g., sodium carbonate or sodium borate gives a pigment precipitate, e. g., of calcium carbonate or calcium borate within the fibers so treated as well as on and around the fibers so treated.

Although the treatment of a portion of the stock reduces the strength of the fibers and even though the treated stock would have little strength if used by itself in making paper, yet when this treated stock is admixed with a large proportion of untreated stock it blends therewith to give an improved sheet of paper of good tensile strength and which can be highly pigmented and produced directly as a pigmented paper as a part of the paper making process.

The new sheet of paper will contain the large proportion of untreated fibers intimately combined and admixed with the pigmented and gelatinized and modified fibers. The paper will accordingly retain the desirable characteristics of paper made from untreated fibers but will in addition have modified and improved properties due to the presence therein of the modified and pigmented fibers and the pigment formed during the treatment of such fibers so that the paper as a whole is a new and valuable pigmented paper directly produced on the paper making machine.

This application is a continuation-in-part of my prior application Serial No. 643,961, filed January 28, 1946, now abandoned, describing the production of fibrous pigments by treating cellulose fibers (chemical pulp) with a strong solution of calcium chloride to modify, hydrate and gelatinize the fibers followed by treatment with sodium carbonate to precipitate a large amount of calcium carbonate pigment in and on and around the fibers, and largely within the fibers; and the use of such fibrous pigment in the outer layer or liner of multiply paper and board.

My companion application Serial No. 666,199, filed April 30, 1946, relates more broadly to the production of multiply layer paper and board with the use of such highly pigmented fibers or fibrous pigments, either alone or admixed with a smaller amount of unpigmented fibers in forming the outer layer or liner of multiply paper and board.

I claim:

1. The method of producing a pigmented and gelatinized cellulosic fibrous stock particularly adapted for admixture with unpigmented cellulosic fibrous stock in the manufacture of paper which comprises subjecting, at ordinary temperatures, an aqueous suspension of cellulosic fibers to the action of a strong solution of calcium chloride until the calcium chloride brings about a gelatinization of the cellulosic fibers, and adding a soluble salt which will react with the calcium chloride to precipitate a calcium compound pigment in and on the gelatinized cellulosic fibers, the amount of calcium chloride in the solution being sufficient that the amount of precipitated calcium compound remaining in and on the fibers is in excess of the weight of the fibers.

2. The method according to claim 1, in which the cellulosic fibers treated are groundwood fibers.

3. The method according to claim 1, in which the cellulosic fibers treated are chemically-treated fibrous pulp.

4. The method according to claim 1, in which sodium carbonate is reacted with the calcium chloride to precipitate a finely-divided calcium carbonate pigment in and on the gelatinized cellulosic fibers.

5. The method according to claim 1, in which the cellulosic fibers are groundwood fibers, in which the calcium chloride solution contains from about 15% to 20% of calcium chloride and in which sodium carbonate is added to react with the calcium chloride to precipitate a finely-divided calcium carbonate pigment in and on the gelatinized cellulosic fibers.

6. The method of making pigmented paper on a papermaking machine, which comprises admixing the gelatinized and pigmented fibers produced in accordance with the method of claim 1, in amount of from about 5% to 25%, with unpigmented cellulosic fibers and forming a pigmented sheet of paper from the resulting admixed fibers.

7. The method according to claim 6, in which the unpigmented cellulosic fibers are chemically-treated fibrous pulp.

8. The method of making pigmented paper on a papermaking machine from a furnish which includes groundwood fibers and chemically-treated fibers in which from about 5% to 25% of the fibers are treated in accordance with the method of claim 1 and the resulting gelatinized and pigmented fibers are admixed with the unpigmented portion of the fibers and the resulting mixture is formed into a sheet of paper on a paper machine.

9. The method of making pigmented paper on a papermaking machine, which comprises admixing the gelatinized and pigmented fibers produced in accordance with the method of claim 4, in amount of from about 5% to 25%, with unpigmented fibers and forming a pigmented sheet of paper from the resulting admixed fiber.

10. The method of making pigmented paper on a papermaking machine from a furnish, which includes groundwood fibers and chemically-treated fibers in which from about 5% to 25% of the fibers are treated in accordance with the method of claim 4 and the resulting gelatinized and pigmented fibers are admixed with the unpigmented portion of the fibers and the resulting mixture is formed into a sheet of paper on a papermaking machine.

11. Highly pigmented gelatinized cellulosic fibers produced in accordance with the method of claim 1 and containing an amount of finely-divided precipitated calcium compound pigment in excess of the dry weight of the fibers.

12. Highly pigmented gelatinized cellulosic fibers as defined in claim 11, in which the weight of the finely divided precipitated pigment is more than twice the weight of the fibers.

13. Highly pigmented gelatinized cellulosic fibers as defined in claim 11, in which the finely-divided precipitated pigment is calcium carbonate.

14. A new sheet of paper made of admixed fibers, from 5% to 25% of which are highly pigmented gelatinized cellulosic fibers as defined in claim 11, and the remainder of the fibers are ungelatinized cellulosic fibers.

15. A new sheet of paper of admixed fibers, from 5% to 25% of which are highly pigmented gelatinized cellulosic fibers as defined in claim 11 and are pigmented with calcium carbonate, and the remainder of the fibers are ungelatinized cellulosic fibers.

WILLIAM LUTTON CRAIG.

REFERENCES CITED

The following references are of record in the file of this patent:

UNITED STATES PATENTS

| Number | Name | Date |
|---|---|---|
| 123,747 | Tieman | Feb. 13, 1872 |
| 157,198 | Duemling | Nov. 24, 1874 |
| 354,477 | Just et al. | Dec. 14, 1886 |
| 2,173,167 | Hovey | Sept. 19, 1939 |
| 2,315,892 | Booth | Apr. 6, 1943 |
| 2,457,797 | Craig | Jan. 4, 1949 |

FOREIGN PATENTS

| Number | Country | Date |
|---|---|---|
| 404 | Great Britain | of 1869 |
| 5,776 | Great Britain | of 1899 |
| 516,162 | Great Britain | Dec. 22, 1939 |

OTHER REFERENCES

Introduction to the Chemistry of Cellulose by Marsh, published by Chapman and Hall, Ltd., London (1938), page 73.